United States Patent [19]

Martin

[11] Patent Number: 5,064,896
[45] Date of Patent: Nov. 12, 1991

[54] ADHESIVE COMPOSITIONS
[75] Inventor: Robin A. Martin, Taylors, S.C.
[73] Assignee: Tanner Chemical Company, Inc., Greenville, S.C.
[21] Appl. No.: 564,098
[22] Filed: Aug. 8, 1990
[51] Int. Cl.$^5$ .............................................. C08L 75/04
[52] U.S. Cl. .................................. 524/731; 524/742; 528/45
[58] Field of Search .................... 524/731, 742; 528/45
[56] References Cited
U.S. PATENT DOCUMENTS
4,600,745  7/1986  Creighton ............................ 525/236

Primary Examiner—Maurice J. Welsh
Attorney, Agent, or Firm—Harry B. Keck

[57] ABSTRACT

Heat curable adhesive compositions which include liquid polybutadiene polymer, powdered sulfur, organic accelerators and inert fillers are improved by adding blocked polyisocyanates or capped polyisocyanates. The addition improves resistance to "popping" of the cured or uncured adhesive when exposed to high temperature, e.g., spot-welding. The addition does not alter the beneficial flow properties and rheological properties of the adhesive. The adhesive is particularly useful on zinc coated steel, both electroplated zinc and hot-dip galvanized zinc coatings. Inclusion of zinc borate will activate the cure accelerators and retard the "popping" phenomenon at welding temperature.

10 Claims, No Drawings

ADHESIVE COMPOSITIONS

BACKGROUND OF THE INVENTION

1. Field of the Invention

This invention concerns improved heat curable, adhesive compositions of the type commonly used in manufacturing for adhesive, gap-filling and sealing purposes in joining components, including automotive applications.

2. Description of the Prior Art

In manufacturing vehicle bodies, joints between component parts may be secured, filled or sealed with adhesive compositions which are then cured to develop full strength and durability of the joints and seals by passing the assembled body through a stoving oven. Preferred adhesive compositions are described in U.S. Pat. No. 4,600,745 as including
liquid polybutadiene polymer,
powdered sulfur,
organic accelerator,
inert fillers.
The liquid polybutadiene polymer in such formulations contains most of the unsaturation in the cis 1,4 configuration. Such adhesive compositions are pastes at normal room temperature and may be cured by heating. The cured compositions show good adhesion to degreased steel, mild steel coated with mill oil and mild steel coated with anodic or cathodic electrophoretic primers.

These prior art compositions have not exhibited adequate adhesion to zinc coated steel, e.g., electro deposition zinc coatings or hot-dip galvanized coatings. The prior art compositions also have a tendency to "popping" when the adhesively joined metal components are subsequently spot-welded at high temperatures. "Popping" is a phenomenon associated with thermal deterioration of the adhesive which is manifested by audible "pops".

STATEMENT OF THE PRESENT INVENTION

The principal object of the present invention is to improve the liquid polybutadiene/sulfur adhesives by increasing their adhesion to zinc coated steel surfaces without altering the other useful properties of the prior art compositions, i.e., flow properties, shelf life, and adhesion to other substrates.

A further object of the invention is to improve the resistance to "popping" of cured or uncured adhesives when exposed to high temperatures of spot-welding.

A still further object of the invention is to achieve improved adhesion and "popping" resistance without reducing the cohesive strength of the prior art adhesive compositions.

According to the present invention, liquid polybutadiene/sulfur adhesive compositions of the type described in U.S. Pat. No. 4,600,745 and other related compositions as hereinafter set forth, are combined with capped or blocked polyisocyanates to achieve improved adhesion to zinc coated metal surfaces. Zinc borate may be added to the compositions to improve the "popping" resistance at elevated temperatures.

Good adhesion of metal components will permit using fewer spot welds in a final multi-element assembly.

DESCRIPTION OF THE PREFERRED EMBODIMENTS

The improved adhesive composition is in the form of a paste comprising 100 parts by weight vulcanizable material such as liquid polybutadiene; 5-60 parts by weight powdered sulfur; 2.5-70 parts by weight accelerator system (hereinafter described) and an inert filler system comprising up to about 80% of the weight of the composition. According to the present invention from 0.2-10 parts by weight of blocked or capped polyisocyanate is included in the composition to achieve the improved adhesion to zinc coated metal surfaces. In addition the compositions preferably contain from 0.2-10 parts by weight of hydrolyzable silane having at least two hydrolyzable groups attached to the silicon atom of the silane. Hydrolyzable silanes are known to improve bonding of organic substances to metal substrates.

To achieve the desired "popping" resistance at elevated temperatures, the composition may contain from about 0.5-20 parts by weight powdered zinc borate.

Prior adhesive compositions have included zinc oxide and stearic acid which tends to solubitize the zinc by creating zinc stearate. The present compositions preferably employ zinc borate which not only activate the accelerators but also retards "popping" of the composition at welding temperatures.

The vulcanizable material preferably is at least 85 weight percent liquid polybutadiene having an average molecular weight of 2,000 to 10,000, a viscosity of 2 to 800 MPas at 170° C. and at least 40% of the ethylenic unsaturation in the 1,4-configuration. Another liquid vulcanizable material for use in this invention is copolymeric 1,4-butadiene and acrylonitrite. The remainder of the vulcanizable material may be depolymerized natural rubber and polybutadiene elastomers. The vulcanizable materials should be substantially free of functional groups other than hydroxyl, carboxyl and ethylenic unsaturation.

Overall, the cross-linking mechanism of the adhesive composition is a reaction of sulfur across unsaturation sites in the base polymers. Accelerators for the cure may be of the sulfur-donor type or the non-sulfur-donor type.

The compositions are essentially anhydrous, i.e., there is no deliberate addition of water to the compositions, although there may be some moisture in the ingredients prior to mixing.

EXAMPLE 1

An adhesive composition according to the prior art (U.S. Pat. No. 4,600,745) includes, is set forth in TABLE I:

TABLE I

| PRIOR ART VULCANIZABLE ADHESIVES | |
|---|---|
|  | Parts by Weight |
| Liquid Polybutadienes (polyols) | 100 |
| Solid Polybutadiene elastomer | 0-11 |
| Sulfur | 5-60 |
| Zinc Oxide | 0-18.5 |
| Accelerator System (sulfur donor) | 2.5-70 |
| Solid Fillers | up to 80% by weight |

BLOCKED OR CAPPED ISOCYANATES

Blocked isocyanates are polyisocyanates such as MDI (methylene diisocyanate) or TDI (toluene diisocyanate) or IDPI (isophorone diisocyanate) in which the isocyanate groups are reacted with a blocking moiety such as a phenolic moiety. The blocked isocyanate cannot react as an isocyanate so long as the blocking moiety is in position. Heating the blocked isocyanate will cause separation of the blocking moiety and will restore the isocyanate moieties for isocyanate reactions. Isocyanates typically react with hydroxyl groups which are available in the polybutadiene diols and react with oxidized surfaces of metal substrates. These materials will bond through cutting oils and it is not necessary to degrease the metal surfaces.

Capped isocyanates are those polyisocyanates which have been reacted with another polymerizable precursor such as an epoxy resin. The capped isocyanates are similarly inactive until the capping moiety is released by means of heating the substance. When an epoxy-capped polyisocyanate is heated, the epoxy groups and the isocyanate groups are free to react with the polybutadiene polyol. The blocked or capped polyisocyanate should have from 4 to 29 weight percent available —NCO content.

For the purpose of the present invention, capped isocyanates or blocked isocyanates are useful and should be introduced into the adhesive composition at the rate of 0.2 to 10 parts by weight for each 100 parts by weight of polybutadiene diol.

The adhesion to zinc-coated and galvanized surfaces is enhanced by the combination of blocked or capped isocyanates and silanes. A useful silane is vinyl-tris (2 methoxy-ethoxy) silane.

EXAMPLE 2

A composition of the present invention is described in TABLE II and particularly includes polyisocyanate blocked with phenol, vinyl tris (2 methoxy-ethoxy) silane and zinc borate. The zinc borate retards the "popping" tendency of the composition at welding temperatures.

EXAMPLE 3

EXAMPLE 3 is another composition of the present invention more fully described in TABLE II. EXAMPLE 3 employs a non-sulfur donor accelerator system along with the phenol blocked polyisocyanate, the vinyl tris (2 methoxy-ethoxy) silane and zinc borate. The non-sulfur donor accelerator system employs N-t-butyl-2-benzothiazole sulfonamide.

EXAMPLE 4

EXAMPLE 4 employs diphenyl guanidine as a secondary acceleration system along with di-2-benzothiazole disulfide and sulfur. EXAMPLE 4 also includes an epoxy capped polyisocyanate, vinyl tris (2-methoxy-ethoxy) silane and zinc borate. Diphenyl guanidine is a secondary accelerator which is useful in sulfur-donor systems and also in non-sulfur donor systems.

TABLE II

| ADHESIVE COMPOSITIONS ACCORDING TO THIS INVENTION | | | |
|---|---|---|---|
| | Parts by weight | | |
| INGREDIENT | EXAMPLE 2 | EXAMPLE 3 | EXAMPLE 4 |
| Lithium catalyzed solid Polybutadiene polyol | 108.4 | 108.4 | 108.4 |
| Polybutadiene liquid polymer av mol wt 2000 | 568 | 568 | 568 |
| Polybutadiene liquid polymer av mol wt 8000 | 528 | 528 | 528 |
| Calcium oxide (in plasticizer) | 108.4 | 108.4 | 108.4 |
| Sulfur | 75.2 | 75.2 | 48 |
| di-2-benzothiazyldisulfide | 94.4 | 105.2 | 72 |
| zinc oxide | 148 | 148 | 148 |
| hindered bisphenol (anti-oxidant) | 18.8 | 18.8 | 18.8 |
| carbon black (pigment, filler) | 18.8 | 18.8 | 18.8 |
| stearate-coated calcium carbonate (filler) | 700 | 700 | 700 |
| calcium carbonate | 402.4 | 402.4 | 402.4 |
| zinc borate | 433.6 | 433.6 | 433.6 |
| butyl benzyl phthalate (plasticizer) | 54.2 | 54.2 | 54.2 |
| talc | 320 | 320 | 320 |
| tetrakis (methylene[3,5-ditert-butyl-4-hydroxy-hydroxyimiamate] methane) (antioxidant) | 20 | 20 | 20 |
| polyisocyanate capped with diglycidyl ether of Bisphenol-A | 0 | 80 | 80 |
| blocked isocyanate | 80 | 0 | 0 |
| gamma aminopropyltriethoxy silane | 43.2 | 43.2 | 43.2 |
| N-t-butyl-2-benzothiazole sulfonamide | 0 | 64.4 | 0 |
| diphenyl guanidine | 0 | 0 | 3.6 |

Each of the EXAMPLES 1 through 4 displayed comparable, rheological properties (comparing viscosity and shear stress with shear rate and shear frequency changes). Thus the desirable flow properties of the prior art adhesive composition (EXAMPLE 1) have been retained with the improved compositions (EXAMPLES 2, 3, 4).

The adhesive properties of the compositions of EXAMPLES 1, 2, 3 and 4 were tested with zinc coated steel specimens including:

A. electroplated zinc coating; and
B. hot dip galvanized coatings.

Samples of the zinc coated steel were obtained in ribbons 25 millimeters wide. Each sample was coated with an adhesive composition of paste-like consistency by applying a film 0.0008 inches thick over 70 millimeters of the forward surface. The coated surface was engaged with a clean surface of another sample ribbon and a clip was applied to retain the two pieces together until the clipped pieces were cured in an oven at 170° C. for 30 minutes. The resulting adhered metal strips were tension-tested in an Instron tester to determine the nature of the bond failure—that is, whether the separation resulted from failure of the adhesive bond or the cohesive bond. The surfaces of each sample were inspected to determine the percentage of each failure which was cohesion failure and the percentage of each failure which was adhesive failure. A first set of specimens (I) were tested at room temperature. A second set of specimens (II) were tested after 14 days exposure at 39° C. and 100% relative humidity; a third set of specimens (III) were tested after 14 days exposure to a heated environment at 88° C. The tests were carried out at 30° C. The results of the tests are set forth in TABLE III.

filler which comprises up to 80 percent of the weight of said composition; the improvement comprising:

0.2-10 p.b.w. of polyisocyanate which is blocked or capped.

2. The adhesive composition of claim 1 including 0.2-10 p.b.w. of a hydrolyzable silane having at least two hydrolyzable groups attached to the silicon atom of said silane.

3. The adhesive composition of claim 1 wherein the said polyisocyanate is an MDI polyisocyanate having an available —NCO content of 4 to 29 weight percent and being capped or blocked with a hydroxy-aromatic or hydroxy-alkyl monomer.

4. The adhesive composition of claim 3 wherein said polyisocyanate is blocked with phenol.

5. The composition of claim 3 wherein said polyisocyanate is capped with an epoxy monomer.

TABLE III

| | ADHESION TESTS ZINC-COATED STEEL | | | | | |
|---|---|---|---|---|---|---|
| | EXAMPLE I | | | EXAMPLE II | | |
| COMPOSITIONS | ADHESIVE STRENGTH N/25 mm$^2$ | C/A* | Number of Samples | ADHESIVE STRENGTH N/25 mm$^2$ | C/A* | Number of Samples |
| TESTED AT ROOM TEMPERATURE | | | | | | |
| (a) Room Temp 6 hrs | | | | | | |
| Electroplated Zinc | 530.8 | 0/100 | 10 | 1005.5 | 0/100 | 18 |
| Galvanized Zinc | 754.9 | 75/25 | 10 | 1251.1 | 95/5 | 18 |
| (b) 14 days 39° C. 100% RH | | | | | | |
| Electroplated Zinc | 703.0 | 0/100 | 10 | 1231.6 | 95/5 | 18 |
| Galvanized Zinc | 1158.1 | 85/15 | 10 | 1330.6 | 95/5 | 18 |
| (c) 14 days 88° C. | | | | | | |
| Electroplated Zinc | 1012.5 | 15/85 | 10 | 1262.8 | 100/0 | 18 |
| Galvanized Zinc | 805.0 | 25.75 | 10 | 1153.2 | 90/10 | 18 |
| (d) 48 hours room temp | | | | | | |
| Electroplated Zinc | 1526.9 | 0/100 | 33 | 1974.0 | 95/5 | 33 |
| TESTED AT 88° C. | | | | | | |
| Electroplated Zinc | 1090.0 | 0/100 | 9 | 1552.2 | 100/0 | 9 |
| Galvanized Zinc | 1335.5 | 40/60 | 9 | 1395.0 | 100/0 | 9 |
| TESTED AT −30° C. | | | | | | |
| Electroplated Zinc | 5076.9 | 95/5 | 9 | 5333.3 | 90/10 | 9 |
| Galvanized Zinc | 5408.9 | 90/10 | 9 | 5609.9 | 80/20 | 9 |

*C/A indicates the percentage of cohesive failures and the percentage of adhesive failures for all specimens.

It will be seen from examination of TABLE III that in all instances the adhesive bonds achieved with the composition of EXAMPLE 2 (the present invention) failed in cohesion more often than adhesion. To the contrary, the compositions of the prior art, EXAMPLE 1, failed more often in adhesion than in cohesion except for the tests of hot dipped galvanized steel exposed for 14 days at 88° C. Even in this environment, the composition of EXAMPLE 2 performed better than the composition of EXAMPLE 1 in the cohesive/adhesive bond failure evaluation.

I claim:

1. In an adhesive composition in the form of a paste comprising 100 p.b.w. vulcanizable material; 5-60 p.b.w. powdered sulfur; 2.5-70 p.b.w. accelerator system; and a filler system containing at least one inert 6. The composition of claim 1 wherein said vulcanizable material is at least 85% by weight liquid polybutadiene having an average molecular weight in the range of 2,000 to 10,000, a viscosity in the range of 2 to 800 MPas at 170° C. and at least 40 percent of the unsaturation in the 1,4-configuration.

7. The composition of claim 1 wherein a portion of said vulcanizable material is depolymerized natural rubber.

8. The composition of claim 1 wherein said accelerator system comprises a sulfur-donor accelerator.

9. The composition of claim 8 wherein said sulfur-donor accelerator is di-2-benzothiazyl disulfide.

10. The composition of claim 1 including 0.5 to 20 percent by weight zinc borate.

* * * * *